United States Patent [19]

Nakayama et al.

[11] Patent Number: 5,275,037
[45] Date of Patent: Jan. 4, 1994

[54] APPARATUS FOR DETECTING MISFIRE IN INTERNAL COMBUSTION ENGINE

[75] Inventors: Masaaki Nakayama, Toyoake; Yasutoshi Baba, Oobu, both of Japan

[73] Assignee: Nippondenso Co., Ltd., Kariya, Japan

[21] Appl. No.: 897,752

[22] Filed: Jun. 12, 1992

[30] Foreign Application Priority Data

Jun. 12, 1991 [JP] Japan .................. 3-140178

[51] Int. Cl.$^5$ ............................ G01M 15/00
[52] U.S. Cl. .............................. 73/117.3
[58] Field of Search .............. 73/116, 117.3; 364/431.07, 431.08; 123/419, 479, 436; 340/439

[56] References Cited

U.S. PATENT DOCUMENTS

| | | |
|---|---|---|
| 3,972,230 | 8/1976 | Hanson et al. ............... 73/116 |
| 4,044,235 | 8/1977 | Frobeaius . | |
| 4,298,228 | 5/1990 | Fujimoto et al. ............. 73/117.3 |
| 5,041,980 | 8/1991 | Maddock et al. ............. 73/116 |
| 5,095,742 | 3/1992 | James et al. ............... 73/116 |
| 5,191,788 | 3/1993 | Nishimura ................. 73/117.3 |

FOREIGN PATENT DOCUMENTS

| | | |
|---|---|---|
| 442687A2 | 8/1991 | European Pat. Off. . |
| 60-26981 | 6/1985 | Japan . |
| 61-258955 | 11/1986 | Japan . |
| 4219448 | 4/1992 | Japan . |

OTHER PUBLICATIONS

"Methods of On-Board Misfire Detection" by Günther Plapp et al.; SAE Paper No. 900232; Feb. 1990.

*Primary Examiner*—Robert Raevis
*Attorney, Agent, or Firm*—Cushman, Darby & Cushman

[57] ABSTRACT

A misfire detecting apparatus for an internal combustion engine which detects the occurrence of misfire in the engine on the basis of a rotation signal outputted in accordance with the rotation of the engine at every predetermined rotational angle a crank shaft of said engine. The apparatus successively calculates a time taken for revolution of the engine by a predetermined crank angle on the basis of the rotation signals outputted from the rotational angle sensor and then sets first and second decision values on the basis of the calculated times in connection with two cylinders of the engine which successively take explosion strokes. The second decision value is set at 360 degrees in the engine rotational angle previous to the setting of the first decision value. The apparatus detects the occurrence of misfire on the basis of the first and second decision values. This arrangement can accurately detect the occurrence of misfire irrespective of the difference in average speed between the respective cylinders.

11 Claims, 5 Drawing Sheets

APPARATUS FOR DETECTING MISFIRE IN INTERNAL COMBUSTION ENGINE

BACKGROUND OF THE INVENTION

The present invention relates to an apparatus for detecting the occurrence of misfire in an internal combustion engine.

As a means for detecting the occurrence of misfire in an internal combustion engine there is known as disclosed in the Japanese Patent Provisional Publication No. 61-258955 where, under the fact that the occurrence of misfire can disturb the complete combustion within combustion chamber of the engine to lower the engine speed, the engine speed is detected at at least two points in the one-ignition cycle to obtain the variation of the engine speed which is in turn compared with a misfire detection value set on the basis of the state of the engine so that the occurrence of misfire is decided when the engine speed variation exceeds the misfire detection value. In this misfire detection apparatus the misfire decision is effected on the assumption that, when the misfire does not occur, the average speed $\omega_n$ at every ignition period (combustion period) is always constant as illustrated in FIG. 8. In FIG. 8, the dotted line shows the instantaneous speed characteristic of the engine and the solid line shows the average speed $\omega_n$ characteristic within each ignition period. However, in the case of a V-type internal combustion engine in which the cylinders are disposed about the crank shaft so as to have a V-configuration, since the connecting rod for connecting the piston to the crank shaft is disposed to have a predetermined angle with respect to the crank shaft, even if the combustion normally occurs, the average speed $\omega_n$ does not become constant due to the inertial force of each cylinder and the like but the average speed $\omega_n$ varies at every 360° CA period as illustrated in FIG. 4. FIG. 4 shows the average speed $\omega_n$ characteristic of each of the cylinders of a V-type 6-cylinder internal combustion engine in which 6 cylinders are disposed to form a V-configuration by sets of 3 cylinders. For example, the average speed $\omega_n$ obtained when the third cylinder takes the explosion stroke is plotted at the top dead center position (#3TDC position) of the third cylinder on the horizontal axis. Similarly, in the case of an in-line type internal combustion engine, there is possibility that the aforementioned 360° CA period variation occurs due to the difference between the crank angle sensors in the manufacturing process, the mechanical looseness of the crank shaft and others. Accordingly, when the average speed $\omega_n$ variation as illustrated in FIG. 4 occurs, there is the possibility that a decision error appears regardless of no occurrence of misfire.

SUMMARY OF THE INVENTION

It is therefore an object of the present invention to provide a misfire detecting apparatus which is capable of accurately detecting the occurrence of misfire irrespective of the average speed variation.

According to this invention, a misfire detecting apparatus for an internal combustion engine successively calculates a time taken for revolution of the engine by a predetermined angle on the basis of rotation signals outputted from a rotational angle sensor at every predetermined rotational angle of the engine and then sets first and second decision values to be used for a decision of an occurrence of a misfire in the engine on the basis of the calculated times in connection with two cylinders of the engine which successively take explosion strokes, the second decision value being set at 360 degrees in the engine rotational angle previous to the setting of the first decision value, thereby detecting an occurrence of misfire on the basis of said first and second decision values. More specifically, the apparatus successively calculates an average speed of the engine for the predetermined angle on the basis of the calculated time and sets the first and second decision values on the basis of the calculated engine average speeds, and compares a difference between the first and second decision values with a predetermined value to detect the occurrence of misfire in accordance with the comparison result.

BRIEF DESCRIPTION OF THE DRAWINGS

The object and features of the present invention will become more readily apparent from the following detailed description of the preferred embodiments taken in conjunction with the accompanying drawings in which.

DETAILED DESCRIPTION OF THE INVENTION

Figure 1:
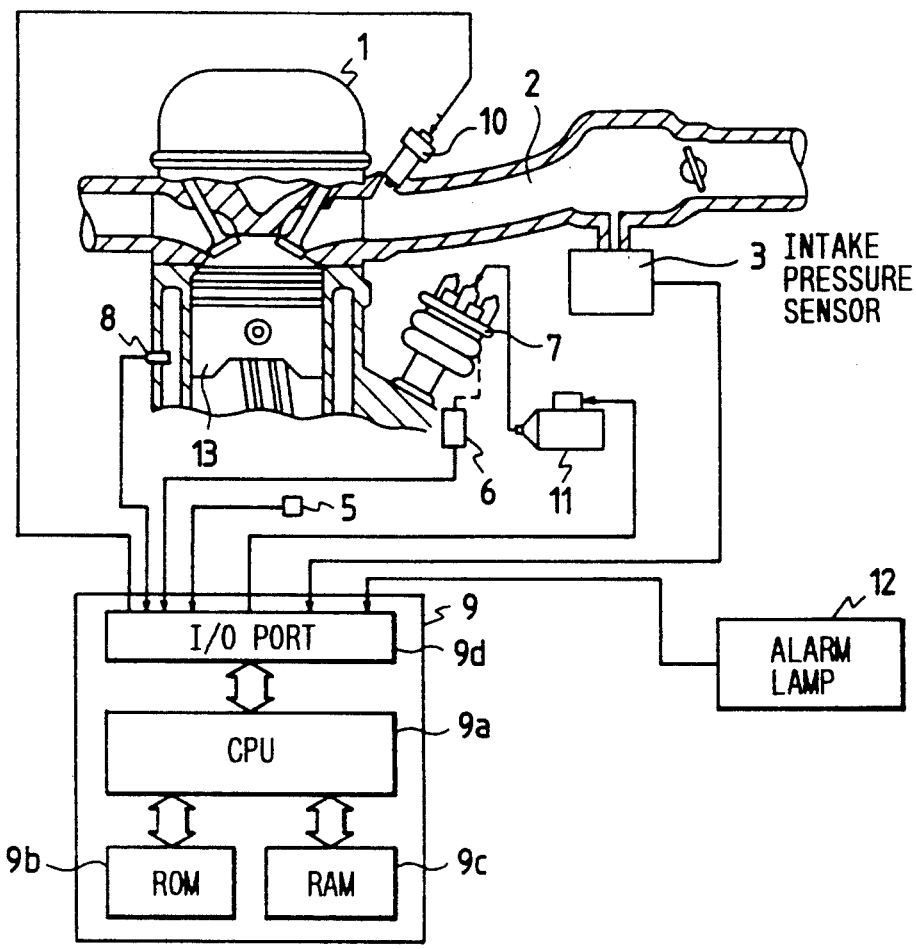
FIG. 1 shows a misfire detecting apparatus according to the present invention which is applied to a V-type internal combustion engine.

Referring now to FIG. 1, there is illustrated a misfire detecting apparatus according to an embodiment of the present invention which is applied to a V-type 6-cylinder internal combustion engine designated at numeral 1 in which 6 cylinders are disposed to form a V-configuration by sets of 3 cylinders. The engine 1 is connected to an intake pipe 2 for leading intake air from an air cleaner (not shown) into the engine 1. In the intake pipe 2 there is provided an intake pressure sensor for sensing a pressure within the intake pipe 2, the detection signal of the intake pressure sensor 3 being inputted to an electronic control unit which will be described hereinafter. Further, in relation to crank shaft of the engine 1 there is provided a rotational angle sensor 5 for generating a signal at every predetermined crank angle to obtain a rotational speed Ne (engine speed) of the engine 1, and within a distributor 7 there is provided a reference position sensor 6 for outputting a signal indicative of one cylinder, for example, outputting the signal whenever the piston for the first cylinder reaches the uppermost position (top dead center: #1TDC). Similarly, the detection signals of the rotational angle sensor 5 and the reference position sensor 6 are inputted to the electronic control unit. In addition, in a cooling water passage of the engine 1 there is provided a water temperature sensor 8 for sensing the temperature of the cooling water, the detection signal of the water temperature sensor 8 being also inputted to the electronic control unit.

Designated at numeral 9 is the electronic control unit for calculating appropriate control amounts for the ignition system and the fuel system on the basis of the detection signals from the above-mentioned sensors to output control signals for an injector 10, an igniter 11 and others. The electronic control unit (which will be referred hereinafter to as ECU) 9 comprises a CPU 9a, a ROM 9b for storing control programs and control constants, a RAM 9c for temporarily storing calculation data during the operation of the CPU 9a, and an input/output (I/O) port 9d for inputting data from external devices and outputting control signals to an external devices. The ECU 9 sets first and second variations on the basis of the detection signal from the rotational angle sensor 5 to detect the occurrence of misfire within the engine 1 on the basis of the first and second variations. In FIG. 1, numeral 12 represents an alarm lamp for informing the operator or the like that the misfire occurs.

Figure 2:
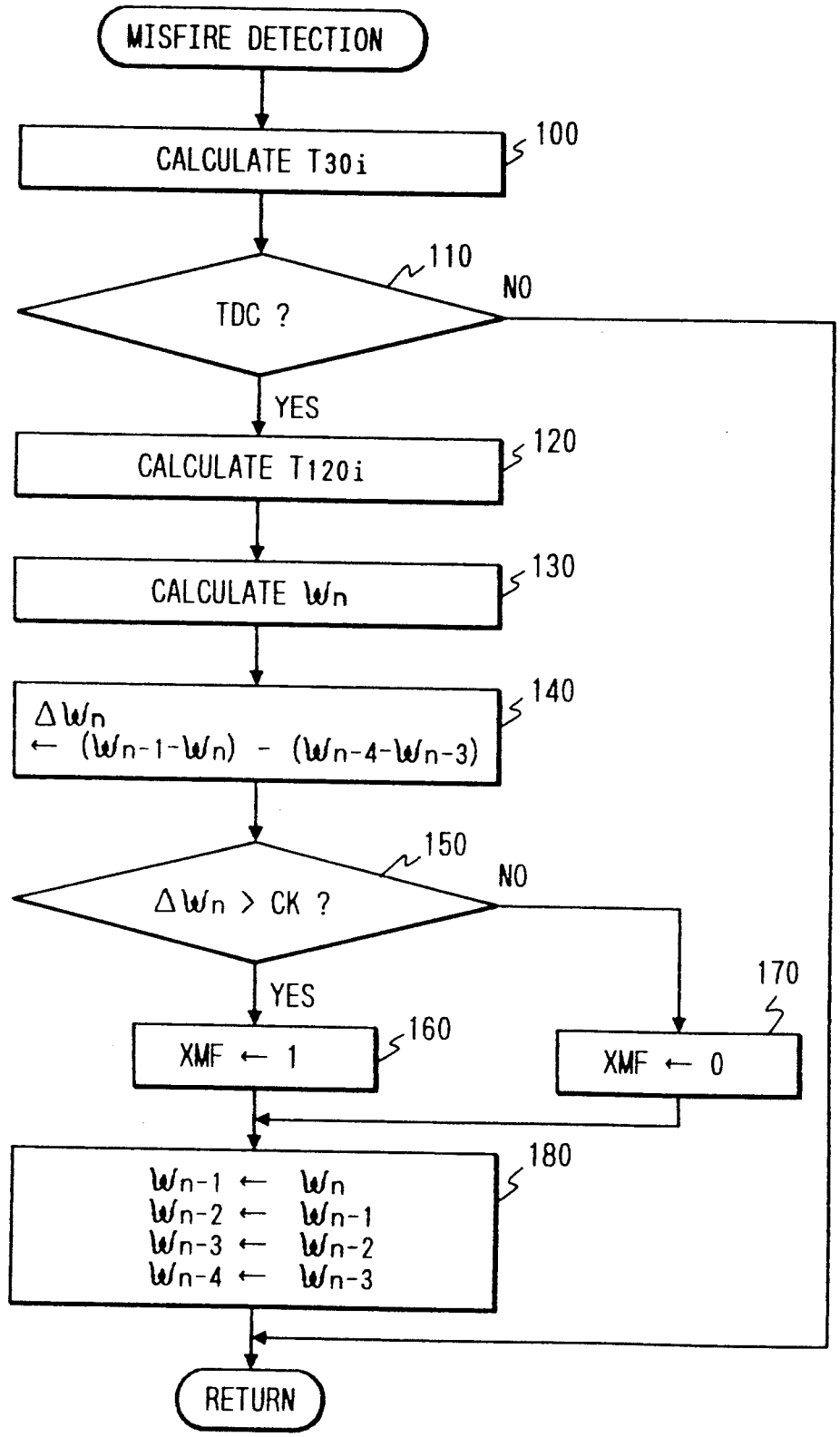
FIG. 2 is a flow chart for describing a misfire detecting operation according to a first embodiment of this invention.

Secondly, a description will be made hereinbelow with reference to FIG. 2 in terms of a misfire detecting operation routine to be executed by the ECU 9. This routine is executed as an interruption routine at every predetermined crank angle (30° CA in this embodiment). In FIG. 2, the operation starts with a step 100 to calculate a time T30i taken for the revolution of 30° CA on the basis of the deviation between the previous interruption time and the present interruption time and then advances to a step 110 to check whether the present interruption timing corresponds to the top dead center (TDC). If not corresponding to the TDC, this routine terminates as it is. On the other hand, if so, the operation proceeds to a step 120 to calculate the time T120i necessary for revolution of 120° CA on the basis of the time T30i calculated in the step 100 and T30i-1, T30i-2, T30i-3 obtained by the previous three operations executed immediately before the present operation. A subsequent step 130 is for calculating the average speed $\omega_n$ in the crank angle 120° CA. More specifically, the inverse of the time T120i obtained in the step 120 is calculated to obtain the average speed $\omega_n$. Then, a step 140 follows to calculate an average speed variation (difference) $\Delta\omega_n$ in accordance with the following equation.

$$\Delta\omega_n = (\omega_{n-1} - \omega_n) - (\omega_{n-4} - \omega_{n-3}) \quad (1)$$

where $\omega_n$ is the present average speed calculated in the step 130, $\omega_{n-1}$ represents the previous average speed, $(\omega_{n-1} - \omega_n)$ denotes the variation (first variation or first difference) in average speed between the cylinders which successively take the explosion strokes, $\omega_{n-3}$ depicts the average speed obtained in the operation of three cycles (three times) before the current operation, $\omega_{n-4}$ designates the average speed obtained in the operation of four cycles before the current operation, and $(\omega_{n-4} - \omega_{n-3})$ is the variation (second variation or second difference) in average speed between the cylinders successively taking the explosion strokes, said second variation being a value a crank angle of 360° CA prior to the first variation. Here, although the first and second variations are obtained in the same operation routine, it is also appropriate that the second variation is in advance obtained in a different operation routine to be stored in the RAM 9c of the ECU 9 and read out at the time of the execution of this operation routine.

In a step 150 the average speed variation $\Delta\omega_n$ calculated in the previous step 140 as compared with a predetermined reference value CK for decision of the occurrence of misfire. If the average speed variation $\Delta\omega_n$ is greater than the reference value CK, the occurrence of a misfire is decided and hence the operational flow goes to a step 160 to set a misfire detection flag XMF to "1" and then advances to a step 180. On the other hand, if in the step 150 $\Delta\omega_n$ is not greater than CK, the operational flow goes to a step 170 to reset the misfire detection flag XMF to "0" and then advances to the step 180. The step 180 is for respectively shifting the present and previous 3 average speeds $\omega_n$, $\omega_{n-1}$, $\omega_{n-2}$, $\omega_{n-3}$ to $\omega_{n-1}$, $\omega_{n-2}$, $\omega_{n-3}$ and $\omega_{n-4}$ (the previous 4 average speed data) and storing them in the RAM 9c of ECU 9, thereafter returning to the main routine.

Figure 3:
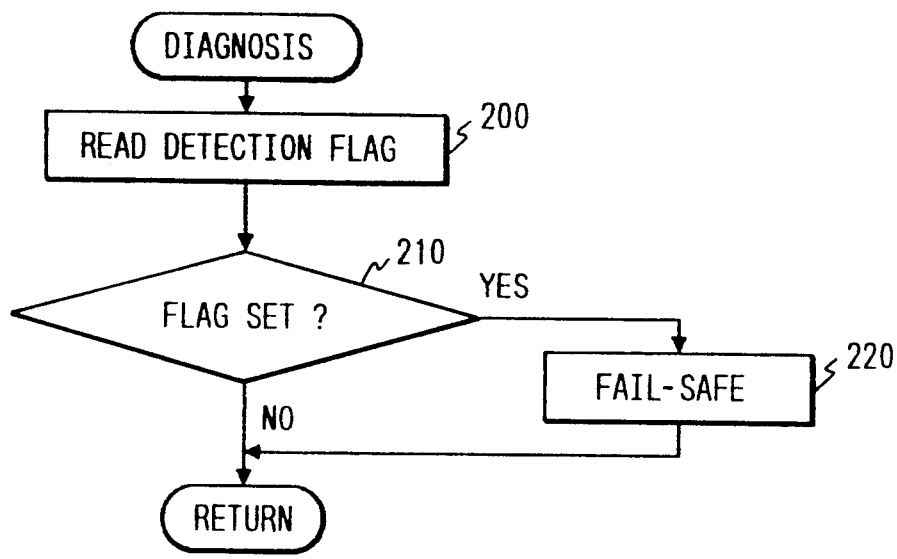
FIG. 3 is a flow chart for a diagnosis operation to be executed in this invention.

FIG. 3 shows a diagnosis operation routine which will be executed at every predetermined time. In FIG. 3, a step 200 is first executed to read a diagnosis detection flag indicative of the various sensor information (for example, the information as to whether the actuator is normally operating) and further read the misfire detection flag XMF to be set when the misfire decision is made in accordance with the operation shown in FIG. 2. Then, a step 210 follows to check the states of the flags. For example, if the misfire detection flag XMF is in the set state, the operation advances to a step 220, and if being not in the set state, the operational flow returns to the main routine. The step 220 is for performing the fail-safe processes in which the fuel supply to the misfire cylinder is cut in order to guard the catalyst and prevent increase in the HC density in the exhaust gas or the alarm lamp 12 is turned on to inform the operator that the misfire occurs.

Figure 5:
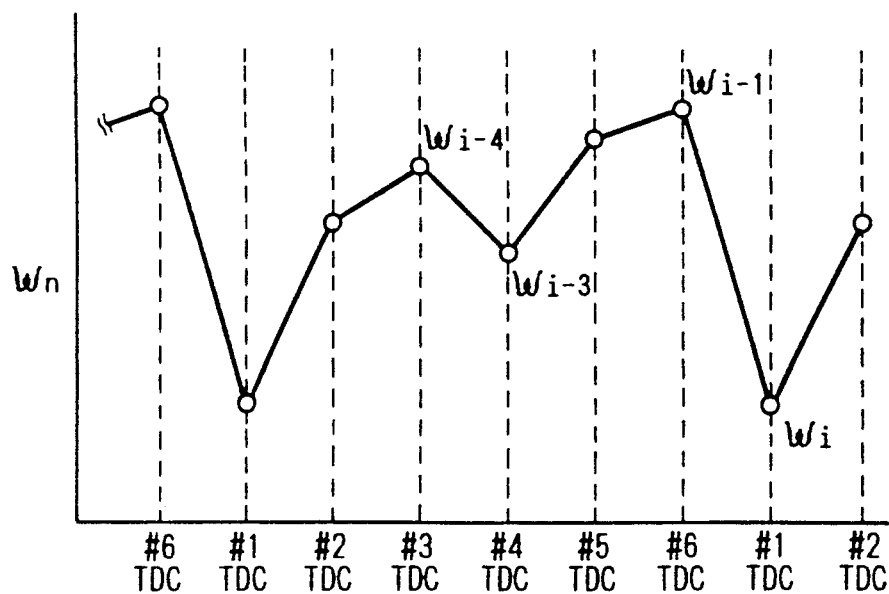
FIG. 5 is a graphic diagram showing an average engine speed characteristic when misfire occurs.
Figure 4:
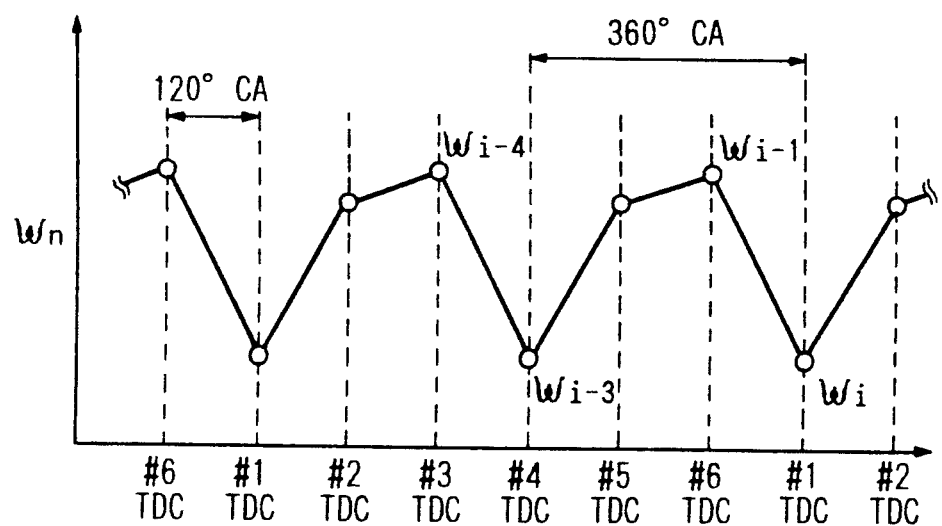
FIG. 4 is a graphic diagram showing an average engine speed characteristic when the engine is in a normal combustion state.

FIGS. 4 and 5 show the variation characteristics of the average speed $\omega_n$ of a V-type internal combustion engine, FIG. 4 indicating the variation characteristic in the case that the misfire does not occur and FIG. 5 indicating the variation characteristic in the case that the misfire occurs in the first cylinder. Here, in FIGS. 4 and 5 the average speeds $\omega_n$ are plotted with respect to the top dead centers (TDC) when the cylinders respectively take the explosion strokes.

As seen from FIGS. 4 and 5, in the V-type internal combustion engine, the average speeds $\omega_n$ are different between the respective cylinders and the average speed variation appears with a period of 360° CA in the crank angle. In this case, according to this embodiment, for example, even if the average speed $\omega_n$ varies to decrease between the sixth cylinder and the first cylinder as shown in FIG. 4, since the misfire decision is made on the basis of the deviation (the average speed variation $\Delta\omega_n$) between the variation of the average speed $\omega_n$ (the second variation $\omega_{n-4} - \omega_{n-3}$) obtained 360° CA before and the present variation of the average speed $\omega_n$ (the first variation $\omega_{n-1} - \omega_n$), it is possible to prevent the misfire decision from being affected by the aforementioned crank angle 360° CA period variation. Further, from FIG. 5 showing the characteristic when the misfire occurs in the first cylinder, it is obvious that the misfire decision can accurately be made on the basis of the deviation (the average speed variation $\Delta\omega_n$) between the variation of the average speed $\omega_n$ $(\omega_{n-4} - \omega_{n-3})$ obtained 360° CA before and the present variation of the average speed $\omega_n$ $(\omega_{n-1} - \omega_n)$. In addition, although in FIG. 5 the average speed $\omega_{n-3}$ of the fourth cylinder is lower as compared with the average speed $\omega_{n-4}$ of the third cylinder, according to this embodiment, it is possible to prevent the decision from being made in error such that the misfire occurs in the fourth cylinder. Accordingly, this embodiment can accurately detects the occurrence of the misfire by taking into account the variation of the average speed $\omega_n$ of the V-type internal combustion engine at every 360° CA.

Although in this embodiment the average speed variation $\Delta\omega n$ is set on the basis of the deviation between the second variation and the first deviation so as to be compared with the reference value CK for decision of the misfire, it is also appropriate that as indicated by the following equation (2) the second variation is divided by the first variation to obtain an average speed variation $d\omega_n$ and the average speed variation $d\omega_n$ is compared with the reference value CK to decide the occurrence of the misfire.

$$d\omega_n = (\omega_{n-4} - \omega_{n-3})/(\omega_{n-1} - \omega_n).$$

Figure 6:
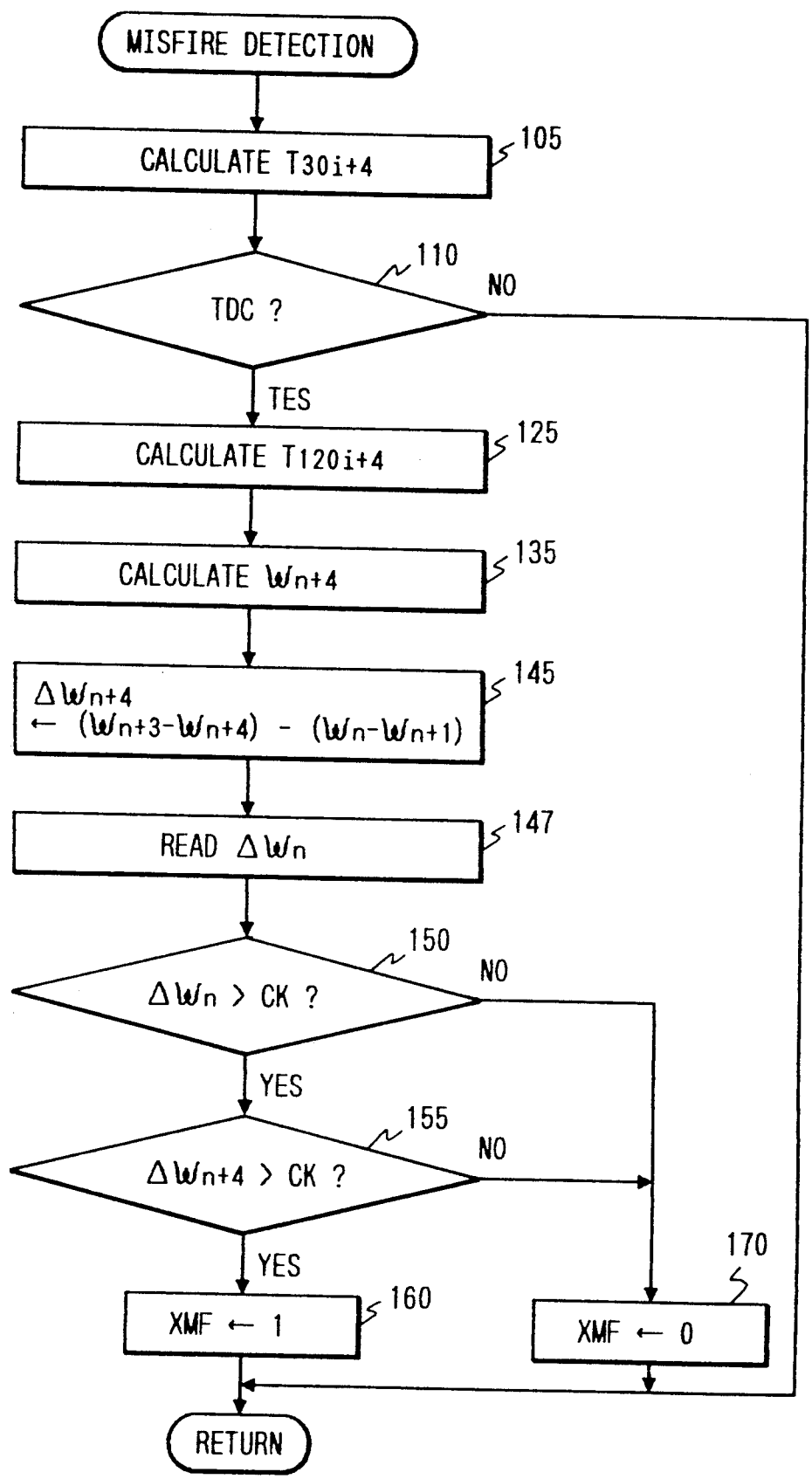
FIG. 6 is a flow chart for describing a misfire detecting operation according to a second embodiment of this invention.

Here, since the average speed $\omega_{n-4}$ obtained in the operation of four cycles ago become low in the case that the misfire occurs in the cylinder of four cycles previous to the current cylinder, in the step 140 of FIG. 2 the average speed variation $\Delta\omega n$ become great whereby there is the possibility that the decision is made such that the misfire occurs in the current cylinder. Thus, a further description will be made hereinbelow with reference to FIG. 6 in terms of a second embodiment of this invention for resolving this problem. The FIG. 6 routine is also an interruption routine executed at every predetermined crank angle (30° CA in this embodiment) as well as in the above-described first embodiment. In FIG. 6, steps corresponding to those in FIG. 2 are marked with the same numerals and the description will be omitted for brevity.

In FIG. 6, in a step 105 there is calculated a time T30$_{i+4}$ taken for revolution of 30° CA. After the execution of a step 110, a step 125 follows to sum the time data T30$_{i+4}$ calculated in the step 105 of the present operation and the time data T30$_{i+3}$, T30$_{i+2}$, T30$_{i+1}$ calculated in the previous 3 operations immediately before the present operation so as to obtain a time T120$_{i+4}$ necessary for revolution of 120° CA. In the next step 135 the average speed $\omega n+4$ in the crank angle 120° CA is calculated on the basis of the time T120$_{i+4}$ calculated in the step 125 and in a step 145 the average speed variation $\Delta\omega_{n+4}$ is calculated in accordance with an equation similar to the above-mentioned equation (1). Subsequently, a step 147 follows to read the average speed variation $\Delta\omega_n$ obtained in the operation of four cycles prior to the current operation. Further, when in a step 150 the average speed variation $\Delta\omega_n$ is greater (longer) than a reference value CK and in a step 155 the present average speed variation $\Delta\omega_{n+4}$ also becomes greater than the reference value CK, the decision is made such that the misfire occurs in the cylinder of four cycles ago, thereafter advancing to a step 160.

According to the second embodiment, it is possible to accurately detect the cylinder in which the misfire occurs and hence to stop the fuel supply to only the cylinder in which the misfire occurs, that is, effectively perform a fail-safe process.

Figure 7:
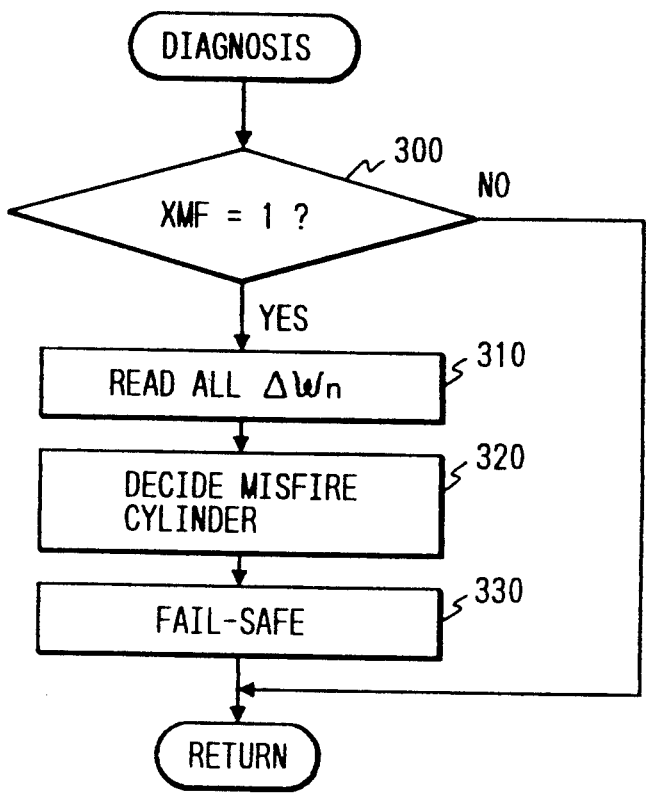
FIG. 7 is a flow chart for describing a misfire detecting operation according to a third embodiment of this invention.
Figure 8:
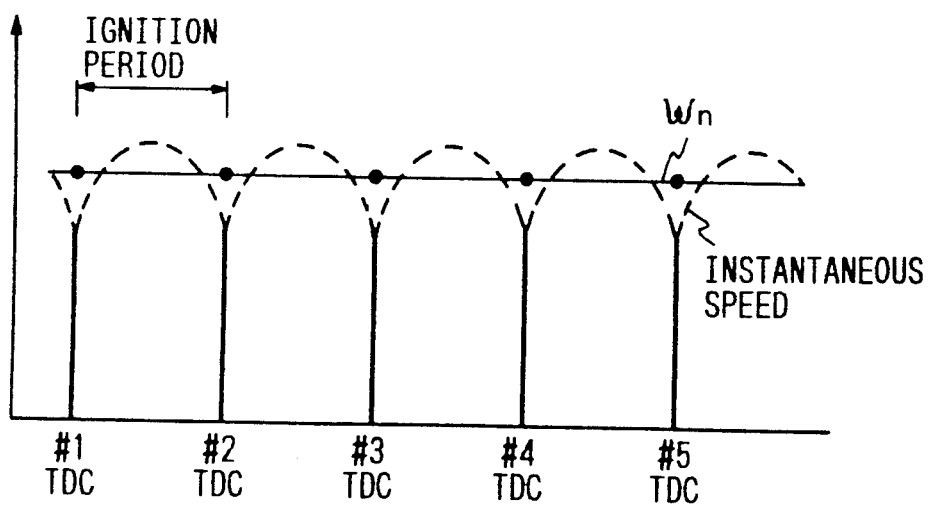
FIG. 8 shows a rotational speed characteristic of an internal combustion engine.

In addition, a description will be made hereinbelow with reference to FIG. 7 in terms of a third embodiment of this invention which is another operation for deciding a cylinder in which the misfire occurs. This operation is executed at every predetermined crank angle (720° CA in the case of a 6-cylinder internal combustion engine). In FIG. 7, the operation starts with a step 300 to check whether a misfire detection flag XMF is in the set state. If set, a step 310 is executed, and if not set, this routine terminates as it is. The step 310 is executed to read all the average speed variations $\Delta\omega_n$ (6 in this embodiment) calculated in the FIG. 2 routine within the interval from the previous execution period to the present execution period, then followed by a step 320 to extract or select the greatest one of the average speed variations $\Delta\omega_n$ to decide the misfire cylinder on the basis of the selected average speed variations $\Delta\omega_n$. After the execution of the step 320, a step 330 follows to perform the fail-safe process such as stopping of the fuel supply to the misfire cylinder.

Although in the above descriptions are made in terms of accurately detecting the misfire by taking into account the average speed $\omega n$ in the 360° CA period in a V-type internal combustion engine, in order for preventing the error decision due to the periodical period variation caused by the scattering of the performance of the crank angle sensor 5 and the mechanical looseness of the crank shaft, this invention is applicable to an inline engine where the cylinders are arranged in series.

According to the embodiments, even if the average speed $\omega_n$ varies because the engine 1 is in the transient state, it is possible to accurately detect the misfire on the basis of the deviation $(\Delta\omega_n)$ between the variation $(\omega_{n-4} - \omega_{n-3})$ obtained 360° CA before and the present variation $(\omega_{n-1} - \omega_n)$ of the average speed $\omega_n$. Further, although the above description is made in terms of a 6-cylinder internal combustion engine, this invention is applicable to different internal combustion engines. For example, in the case of an 8-cylinder engine, the second average speed variation 360° CA before the first variation $(\omega_{n-1} - \omega_n)$ is taken as $(\omega_{n-5} - \omega_{n-4})$. In addition, although in the above description the time T30$i$ taken for revolution of the predetermined rotational angle (30° CA) is obtained so as to calculate the average speed $\omega n$ to calculate the first and second variations, it is appropriate that the first and second variations are obtained directly on the basis of the time T30$i$ taken for revolution of the predetermined rotational angle.

It should be understood that the foregoing relates to only preferred embodiments of the present invention, and that it is intended to cover all changes and modifications of the embodiments of the invention herein used for the purposes of the disclosure, which do not constitute departures from the spirit and scope of the invention.

What is claimed is:

1. A misfire detecting apparatus for an internal combustion engine, comprising:
   rotation signal outputting means responsive to a rotation of said engine for outputting a rotation signal at every predetermined rotational angle;
   actual value calculating means for calculating an actual value by measuring a time taken for a revolution of a predetermined rotational angle in an explosion stroke of each cylinder of said engine on the basis of said rotation signal outputted from said rotation signal outputting means;
   first variation setting means for setting a first variation by obtaining a deviation between the actual values obtained in connection with two cylinders of said engine, which successively take the explosion strokes, on the basis of the calculation results of said actual value calculating means;

second variation setting means for setting a second variation by obtaining a deviation between the actual values obtained in connection with two cylinders of said engine, which successively take the explosion strokes, on the basis of information from said rotation signal outputting means and said actual value calculating means, the actual values used by said second variation setting means being 360° CA in the rotational angle before the actual values used by said first variation setting means; and misfire detecting means for detecting an occurrence of misfire in said engine on the basis of said first and second variations.

2. An apparatus as claimed in claim 1, wherein said actual value calculating means calculates an average rotational time in the explosion stroke.

3. An apparatus as claimed in claim 1, wherein said actual value calculating means calculates a speed of said engine in the explosion stroke.

4. An apparatus as claimed in claim 1, wherein said engine is a V-type internal combustion engine.

5. A misfire detecting apparatus for an internal combustion engine, comprising:

rotational angle sensor means for outputting a rotation signal at every predetermined rotational angle of said engine;

time calculating means for successively calculating a time taken for revolution of said engine by a predetermined angle on the basis of the rotation signals outputted from said rotational angle sensor means;

decision value setting means for setting first and second decision values to be used for a decision of an occurrence of a misfire in said engine on the basis of the times calculated by said time calculating means in connection with two cylinders of said engine which successively take explosion strokes, said second decision value being set at 360 degrees in the engine rotational angle previous to the setting of said first decision value; and misfire detecting means for detecting an occurrence of misfire on the basis of said first and second decision values.

6. An apparatus as claimed in claim 5, wherein said decision value setting means successively calculates an average speed of said engine for said predetermined angle on the basis of the time calculated by said time calculating means so as to set said first and second decision values on the basis of the calculated engine average speeds.

7. An apparatus as claimed in claim 6, wherein each of said first and second decision values is a variation between the successively calculated average speeds.

8. An apparatus as claimed in claim 5, wherein said misfire detecting means compares a difference between said first and second decision values with a predetermined value to detect the occurrence of misfire in accordance with the comparison result.

9. An apparatus as claimed in claim 5, wherein said misfire detecting means divides said second decision value by said first decision value to detect the occurrence of misfire in accordance with the division result.

10. An apparatus as claimed in claim 5, wherein said misfire detecting means successively calculates a difference between said first and second decision values set by said decision value setting means and detects the occurrence of misfire on the basis of the selected greatest difference.

11. An apparatus as claimed in claim 5, wherein said misfire detecting means successively calculates a difference between said first and second decision values set by said decision value setting means and compares the present difference and the previous difference preceding the present difference with a predetermined value to detect the occurrence of misfire on the basis of the comparison results.

* * * * *